United States Patent [19]
Kameoka et al.

[11] Patent Number: 6,030,286
[45] Date of Patent: Feb. 29, 2000

[54] CENTRIFUGAL BLOWER HAVING A PLURALITY OF SUB BLADES

[75] Inventors: Teruhiko Kameoka, Okazaki; Koji Ito, Nagoya; Kouji Matsunaga, Kariya; Kazutoshi Kuwayama, Nakashima-gun, all of Japan

[73] Assignee: Denso Corporation, Kariya, Japan

[21] Appl. No.: 09/007,647

[22] Filed: Jan. 15, 1998

[30] Foreign Application Priority Data

Jan. 19, 1997 [JP] Japan ..................................... 9-019011
Apr. 10, 1997 [JP] Japan ..................................... 9-092415

[51] Int. Cl.$^7$ ..................................................... B60S 1/54
[52] U.S. Cl. ........................ 454/121; 415/119; 415/185; 415/195; 415/208.2
[58] Field of Search .................................... 415/185, 186, 415/195, 204, 206, 208.1, 208.2, 119; 454/121

[56] References Cited

U.S. PATENT DOCUMENTS 5,814,908 9/1998 Muszynsi ................................... 310/52

FOREIGN PATENT DOCUMENTS 321303 10/1934 Italy ......................................... 415/195
57-93700 6/1982 Japan ..................................... 415/119

Primary Examiner—Edward K. Look
Assistant Examiner—Liam McDowell
Attorney, Agent, or Firm—Harness, Dickey & Pierce, PLC

[57] ABSTRACT

In a centrifugal blower in which the outer periphery of an intake opening is arranged outside of the inner edge of a main blade, a large number of sub blades are provided in the intake opening at a location corresponding to the main blade. The sub blades lead the secondary air flowing from an outside area of the intake opening to a rotating direction of a centrifugal multi blade fan. Thus, the secondary air flows from the sub blade to the main blade smoothly, thereby increasing a secondary air flow amount and reducing air flow noise.

13 Claims, 12 Drawing Sheets

CENTRIFUGAL BLOWER HAVING A PLURALITY OF SUB BLADES

CROSS REFERENCE TO RELATED APPLICATION

This application is based on and incorporates herein by reference of Japanese Patent Application No. Hei. 9-19011 filed on Jan, 31, 1997 and Hei. 9-92415 filed on Apr. 10, 1997.

BACKGROUND OF THE INVENTION

1. Field of the Invention

The present invention relates to a centrifugal blower provided with a sub blade, which is suitable for use in an air conditioning apparatus for a vehicle.

2. Description of Related Art

A centrifugal blower is constructed by a centrifugal multi blade fan which includes a plurality of blades disposed around a rotating axis, a scroll casing defining an air inlet and an outlet, and a drive motor for rotating the fan. A blower performance such as an air discharging ability and a noise reducing ability depends on its fan shape and casing shape, thus it is necessary to consider these factors so as to improve a blower performance.

Japanese Unexamined Patent Publications No. 5-306699 and No. 5-302600 disclose a centrifugal blower in which an opening area of an air intake opening is enlarged for increasing an air flow amount. In this centrifugal blower, as shown in FIG. 15, outer periphery of the air intake opening 76 is arranged at the outside of the inner edge 72a of the blade 71.

In this blower, because the air inlet is enlarged, adding to a main air which is introduced from the inner edge 72a of the blade 71, a secondary air which is introduced from the upper end 71a of the blade 71. Then, both the main air and the secondary air are discharged from the entire outer edge 72b of the blade 71, thereby increasing the air discharge amount.

However, a path through which the secondary air flows is shorter than that of the main air. Thus, a kinetic energy imparted to the secondary air is small.

Accordingly, when the blower is used in an air passage system with a low pressure loss, the air flow amount can be increased as described above. However, when it is used in an air passage system with a high pressure loss, the air flow amount cannot be increased.

Here, FIG. 16 shows a result of a simulation of the air which flows between the blades, and a length of a vector (arrow) denotes an air flow velocity at a starting point of the vector.

That is, in the air passage system with a high pressure loss, as shown in FIG. 16, a reverse air which flows from the outer edge 72b to the inner edge 72a at a location where the secondary air flows, i.e., a dead air flow area (eddy flow), arises.

Thus, a noise caused by a friction between the reverse air flow and the main air flow arises. Further, the main air flow amount and the secondary air flow amount are reduced by the friction with the reverse air flow, thereby reducing the total air flow generated by the blower.

SUMMARY OF THE INVENTION

An object of the present invention is to reduce an air flow noise and increase air flow amount even when the centrifugal blower is used in an air passage system with a high pressure loss, in a centrifugal blower in which an air intake opening area is enlarged for increasing an air flow amount.

According to the first aspect of the present invention, a large number of sub blades are provided in the intake opening at a location corresponding to main blades, and the sub blade leads a secondary air to an intake opening side end of the main blade. Thus, the secondary air is introduced from the intake opening side to a space between adjacent main blades positively, so, the secondary air can be given kinetic energy by the main blade effectively rather than by a blower having no sub blades. Accordingly, even when it is used in the high pressure loss air passage system, the blower suppresses an occurrence of a reverse air flow (dead flow area) and a friction between a main flow and the reverse air flow. Thus, occurrence of an eddy flow is suppressed, and a noise caused by the eddy flow is reduced. That is, an amount of the secondary air flow is prevented from being reduced.

According to the second aspect of the present invention, a bell mouth ring-shaped guide wall is provided at the inside of the sub blade and elongates toward an air downstream side rather than the intake opening side end of the main blade. Thus, the main air is introduced to the inner edge of the main blade without flowing into a location where the secondary air flows, and a friction between the main air and the secondary air is prevented.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Figure 1:
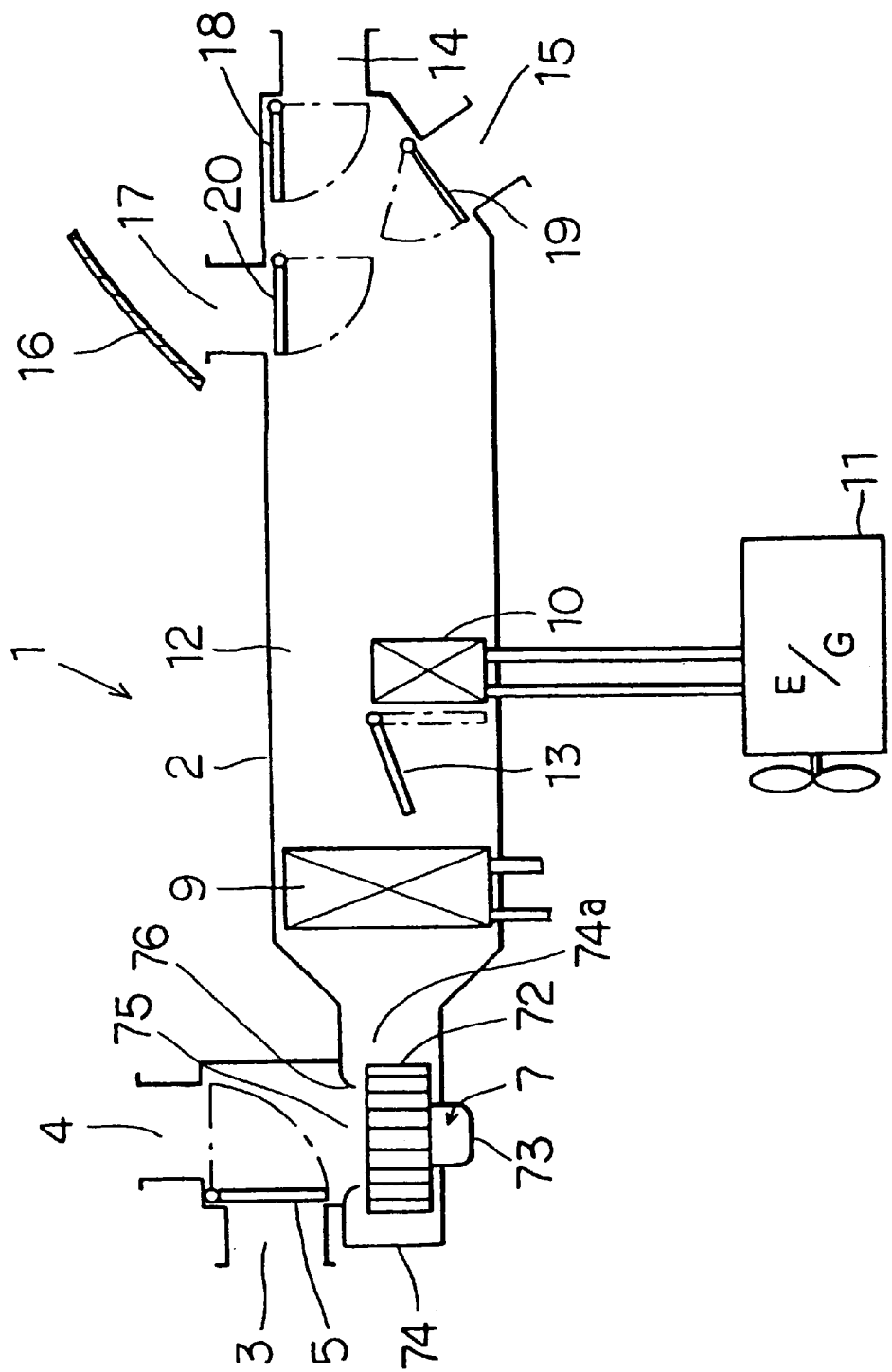
FIG. 1 is a schematic view of an entire air conditioning apparatus for a vehicle including a centrifugal blower according to the present invention.

Referring to the drawings, preferred embodiments of the present invention will be described.

(First Embodiment)

As shown in FIG. 1, a centrifugal blower 7 according to the present embodiment is applied to an air conditioning apparatus 1 for a vehicle.

At the upstream side of an air conditioning casing 2 forming an air passage, an internal air inlet 3 through which the internal or vehicle interior air is introduced and an external air inlet 4 through which the external or vehicle exterior air is introduced are provided. For opening and closing these internal air inlet 3 and external air inlet 4 selectively, an inlet selecting door 5 is provided. The inlet selecting door 5 is controlled by an actuator like a servomotor or a manual manipulating means.

The centrifugal blower 7 is disposed at the air downstream side of the inlet selecting door 5. The centrifugal blower 7 draws air from the internal air inlet 3 or the external air inlet 4 and discharges the air toward a face air outlet 14, a foot air outlet 15, and a defroster air outlet 17. An evaporator 9 is disposed at the air downstream side of the centrifugal blower 7, and cools all the air discharged from the centrifugal blower 7. A heater core 10 is disposed at the air downstream side of the evaporator 9, and heats the air passing therethrough by carrying out a heat exchange between the coolant of an engine 11 and the air.

A bypass passage 12 through which the air bypassing the heater core 10 flows is provided in the air conditioning casing 2. An air mixing door 13 which controls an air flow mixing ratio of the air passing through the heater core 10 and the air passing through the bypass passage 12 is disposed at the air upstream side of the heater core 10. This air flow mixing ratio is controlled by adjusting opening degree of the air mixing door 13.

At the most air downstream portion of the air conditioning casing 2, the face air outlet 14 through which the air-conditioned air is discharged toward the face area of a passenger, the foot air outlet 15 through which the air-conditioned air is discharged toward the foot area of a passenger, and the defroster air outlet 17 through which the air-conditioned air is discharged toward inside of a windshield glass 16 of the vehicle are provided.

At each air upstream side of the air outlets 14, 15 and 17, blow mode selecting doors 18, 19 and 20 are provided. These blow mode selecting doors 18, 19 and 20 are controlled by actuators such as a servomotor or a manual manipulating means.

Here, opening area of the foot air outlet 15 and the defroster air outlet 17 are smaller than that of the face air outlet 14, thus, air passage resistance (pressure loss) in the foot blow mode and the defroster blow mode are larger than that in the face blow mode.

The centrifugal blower 7 draws the air in the rotation axis direction and discharges the air in the radial direction. The centrifugal blower 7 is constructed by a fan 72 and a casing 74 in which the fan 72 is disposed.

Figure 2:
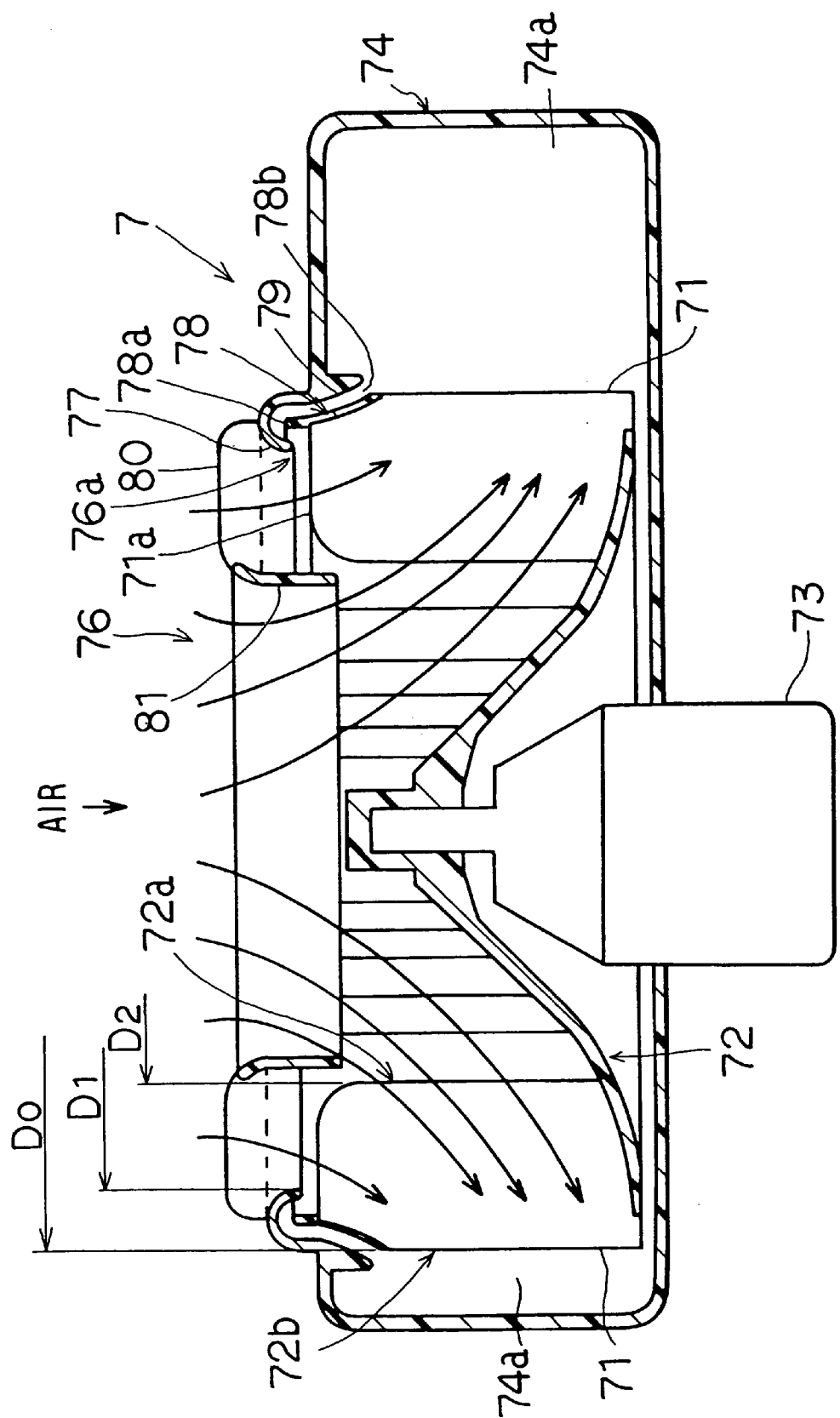
FIG. 2 is a cross sectional view of a centrifugal blower according to the first embodiment, taken along a line II—II in FIG. 3.

As shown in FIG. 2, The fan 72 has a large number of main blades 71 around a rotating shaft and is rotated by an electric motor 73. An amount of air flow is controlled by changing the rotating speed of the motor 73.

The casing 74 is formed into a scroll shape and made of resin such as a polypropylene. The casing 74 includes an air passage 74a through which the air discharged from the fan 72 flows, and an outlet 75 communicating to the air conditioning casing 2 at the downstream side of a scroll end position 74b. At the upper portion of the casing 74, an intake opening 76 for introducing the air into the casing 74 is formed, and at the outer periphery 76a of the intake opening 76, a bell mouth 77 for introducing the air smoothly is formed.

Here, the outer periphery 76a of the intake opening 76 is located outside of the inner edge 72a of the blade 72 and inside of the outer edge 72b of the blade 72 in a radial direction ($D_0 > D_1 > D_2$).

At the outer side of an upper end 71a of the blade 71, a shroud 78 is formed. The shroud 78 is formed into a ring shape so as to lead the air from the rotation axis direction to the radial outward direction, and has a protrusion portion 78a protruding from the upper end 71a of the blade 71 toward the air intake opening 76 side. A cross sectional shape of the bell mouth 77 is formed into U shape so as to cover the protrusion portion 78a of the shroud 78 from the air intake opening 76 side.

At the location of the casing 74 which is next to the bell mouth 77, a facing bent wall 79 is formed with a predetermined gap to the shroud 78. The facing bent wall 79 is formed in such a manner that it is bent from the bell mouth 77 side to the radial outward direction along an outer surface of the shroud 78.

Figure 4:
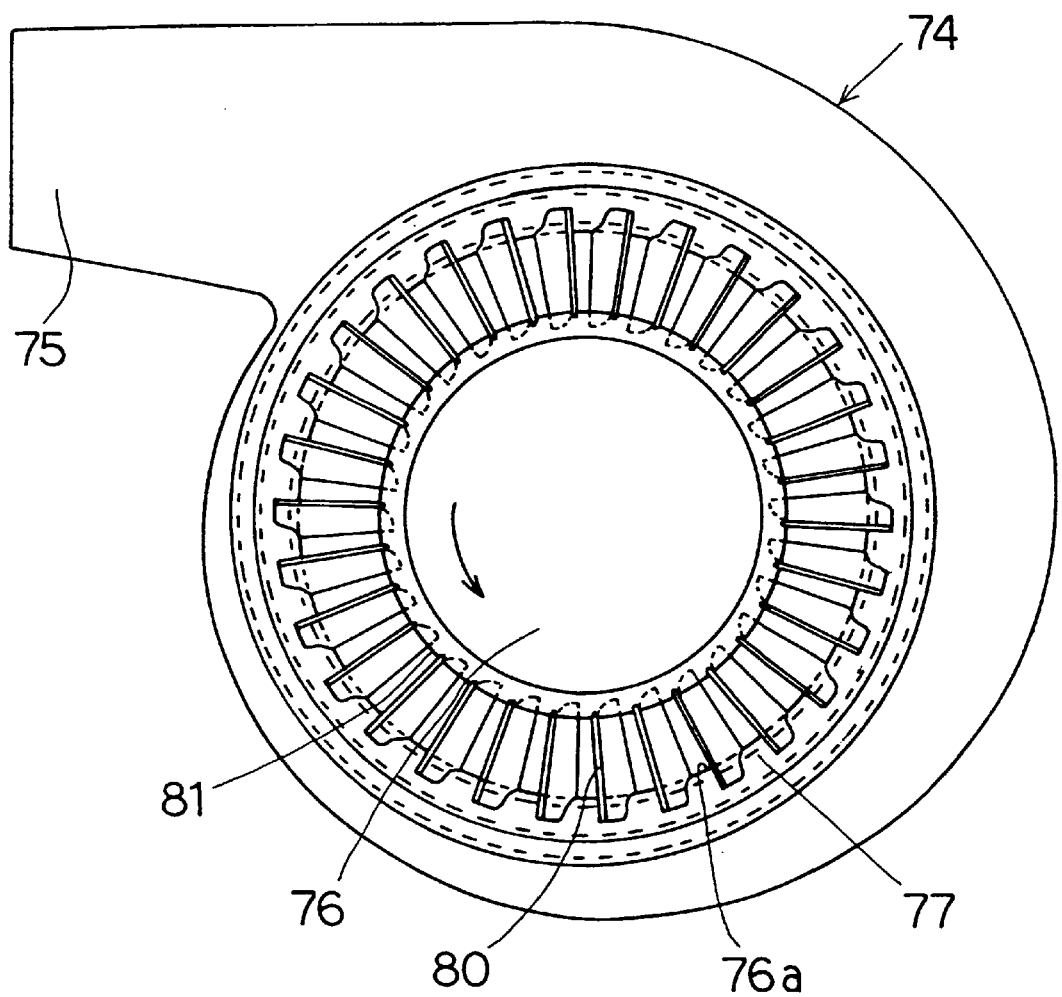
FIG. 4 is a plan view of the centrifugal blower.
Figure 5A:
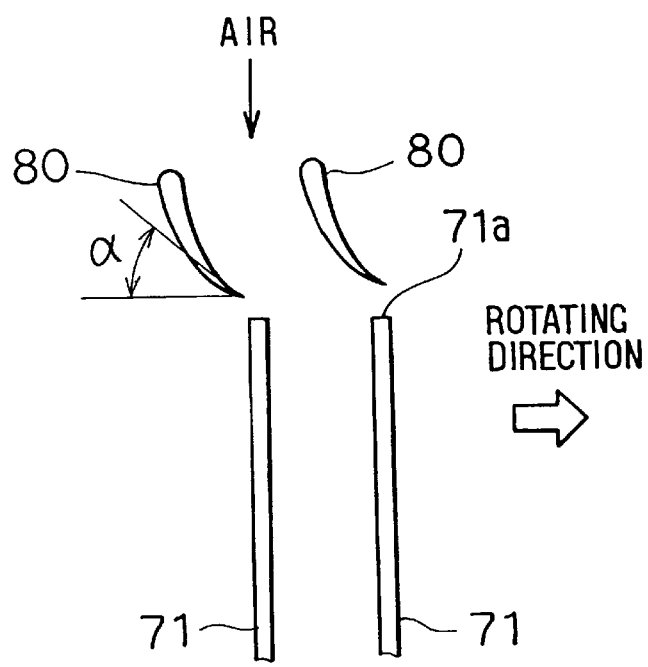
FIGS. 5A and 5B are schematic views showing a relation between a main blade and a sub blade.
Figure 5B:
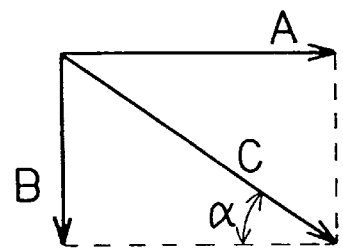

At the inside of the bell mouth 77, as shown in FIGS. 2 and 4, a large number of sub blades 80 are formed for introducing the air (secondary air) toward the upper end 71a (intake opening side end) of the main blade 71. The sub blades 80 are integrated with the casing 74 as well as the bell mouth 77. The sub blades 80, as shown in FIG. 5A, lead the air flowing from the outside area of the inlet opening 76 to the rotating direction of the fan 72.

Further, at the inside of the sub blade 80, as shown in FIG. 2, a guide wall 81 is formed. The guide wall 81 is formed into bell-mouth ring shape and elongates toward the air downstream side rather than the upper end 71a of the blade 71 and inside of the inner edge of the blade 71. The guide wall 81 is integrated with the casing 74 as well as the sub blade 80 and the bell mouth 77.

According to the present embodiment, since the sub blade 80 leads the secondary air toward the upper end 71a of the blade 71, the secondary air is introduced from the upper end 71a to the space between the adjacent main blades 71 positively. Thus, the secondary air can be given kinetic energy by the fan 72 (main blade 71) effectively rather than by a blower having no sub blade 80.

Accordingly, even when it is used in the high pressure loss air passage system, the blower of the present embodiment suppresses occurrence of a reverse air flow (dead flow area) and friction between the main air flow and the reverse air flow. Thus, an occurrence of an eddy flow is suppressed, and a noise caused by the eddy flow is reduced. That is, the amount of the secondary air flow is prevented from being reduced.

Further, since an area between the adjacent main blades through which the main air flows is provided by suppressing the occurrence of the eddy flow, reducing of the main air amount by the friction with the reverse air can be prevented.

As described above, according to the present embodiment, the amount of air flow discharged by the blower can be increased by providing the sub blade even when it is used for the high pressure loss passage system.

The sub blade 80 leads the secondary air from the outside area of the intake opening 76 to the rotating direction of the fan 72. Thus, the secondary air can be introduced from the sub blade 80 to the main blade 71 smoothly rather than the secondary air having no rotating direction vector. Accordingly, the amount of the secondary air introduced into the blade 71 is increased and the secondary air is imparted kinetic energy effectively, thereby the occurrence of the reverse air (dead air area) is suppressed in the high pressure passage system.

For leading the secondary air from the sub blade 80 to the main blade 71, it is preferable that the outlet angle α of the sub blade 80 (an angle between the air downstream side end of the sub blade 80 and the rotating direction of the fan 72) is set to be equal to an angle between the peripheral speed vector A (a rotating speed vector of the fan 72 at the upper end 71a) and the vector C which is a resultant of the peripheral speed vector A and the air flowing speed vector B into the intake opening 76.

The guide wall 81 elongates toward the air downstream side (the motor 73 side) rather than the upper end 71a of the blade 71, thereby the main air is introduced to the inner edge 72a of the fan. Thus, the main air is introduced to the inner edge 72a without flowing into the dead air area, and the friction between the main air and the secondary air is prevented. Here, according to the research of the inventor, it was confirmed that a reduction in friction is effective for reducing a low frequency noise.

Figure 6:
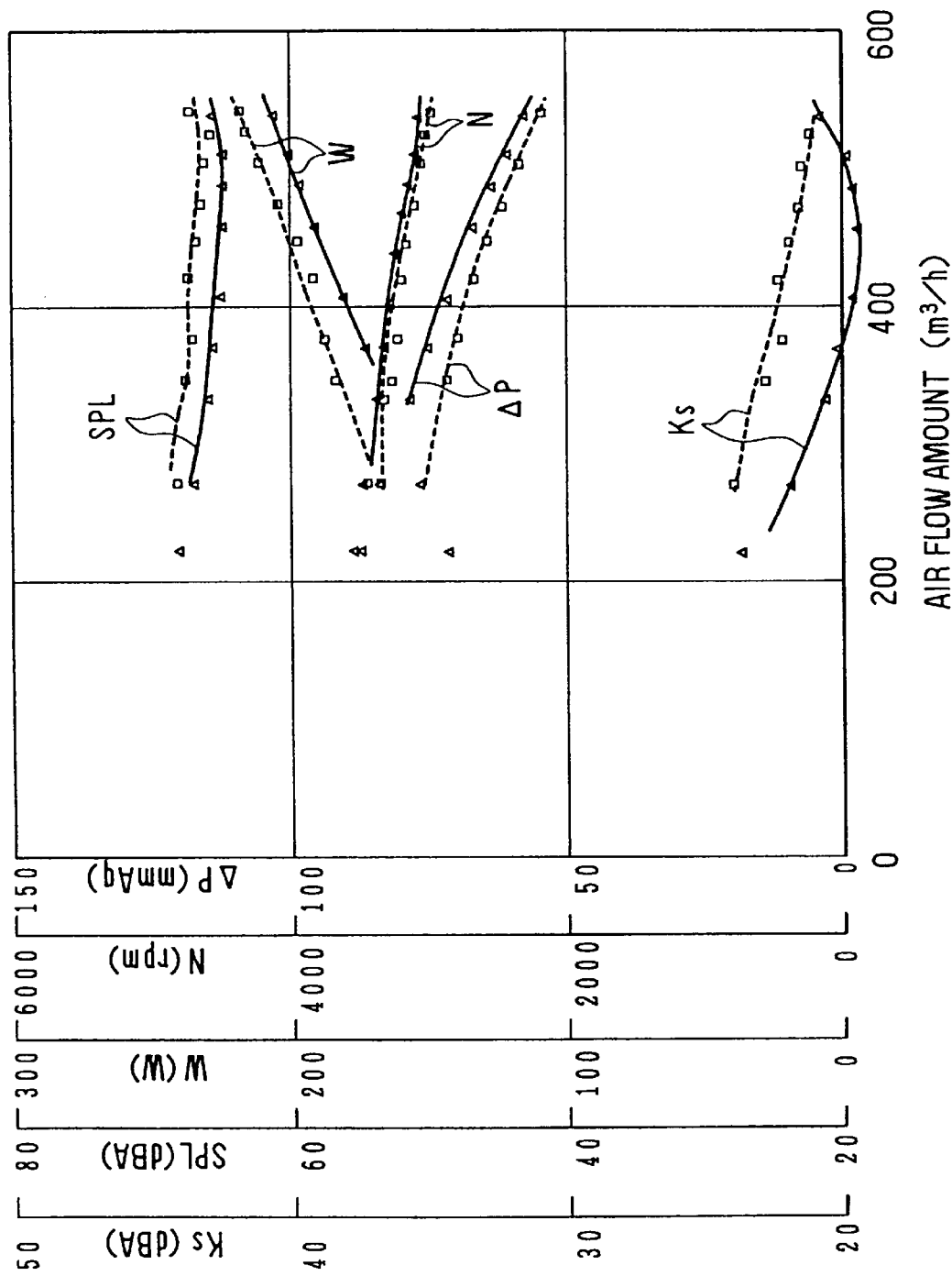
FIG. 6 shows a performance test result of the centrifugal blower.

In FIG. 6, the solid line denotes a performance test result of the blower (which is provided with the sub blade 80 and the guide wall 81) according to the present embodiment, while the dotted line denotes that of the conventional blower having no sub blade 80 and no guide wall 81.

As is apparent from FIG. 6, the centrifugal blower of the present embodiment is superior in reducing a specific sound level Ks and a noise level SPL and increasing a total pressure ΔP at the same air flow amount in comparison with the conventional blower. Here, when air flow amount is more than 550 m³/h, the specific sound level Ks is inferior to that of the conventional blower, however, it is no problem for an air conditioning apparatus for a vehicle because an air flow amount more than 550 m³/h is not required in such an air conditioning apparatus.

Further, as is apparent from the relation between the number of rotations N of the motor and the electric power consumption W at the same air flow amount, the blower of the present embodiment is superior in view of efficiency to the conventional blower.

Figure 7:
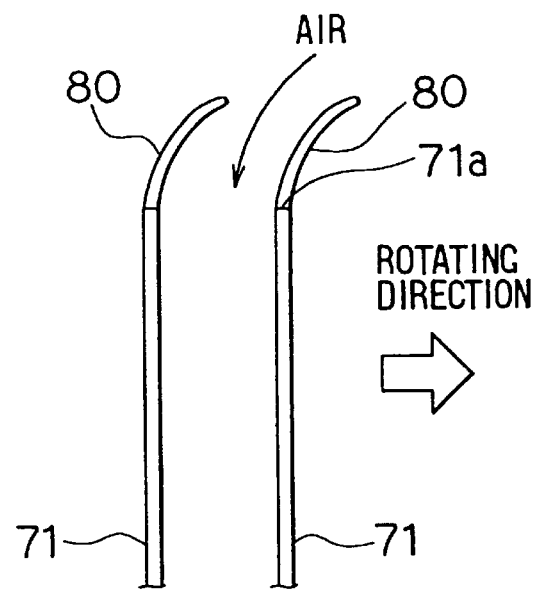
FIG. 7 is a schematic view showing a relation the main blade and the sub blade according to a modification of the first embodiment.

According to the present embodiment, the sub blade 80 and the guide wall 81 are integrated with the casing 74. Contrary to this, integrating the guide wall 81 to the upper end 71a of the main blade 71 at the inner edge 72a thereof, and the sub blade 80 to the upper end 71a of the main blade 71 is possible. However, in this structure, as shown in FIG. 7, the sub blade 80 needs to be set so as to lead the secondary air introduced into a space between adjacent sub blades 80 to a rotation axis direction (to the motor 73 side) along with the rotation axis of the fan 72.

(Second embodiment)

The second embodiment is to reduce a noise called a rotation noise.

Figure 3:
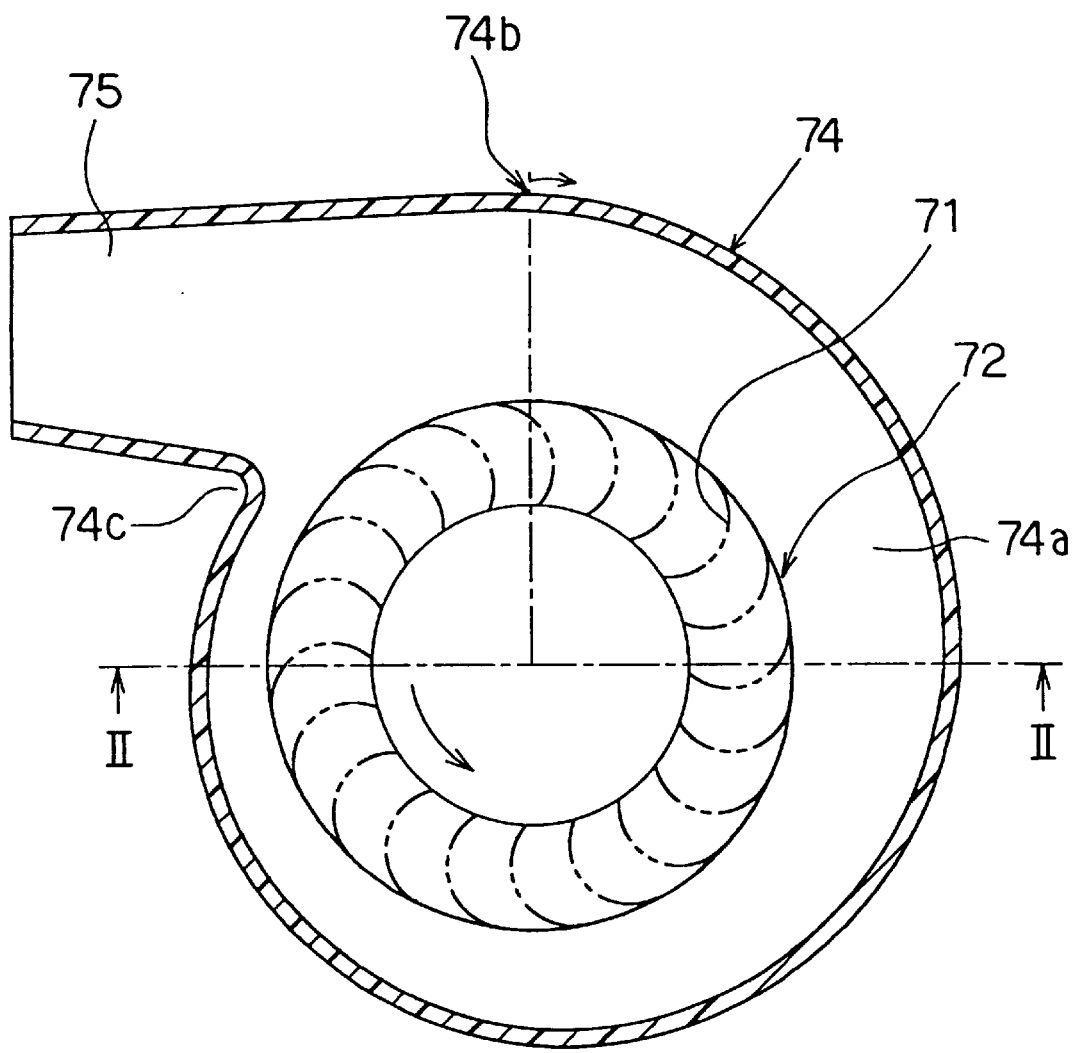
FIG. 3 is a transverse cross sectional view of the centrifugal blower.
Figure 8:
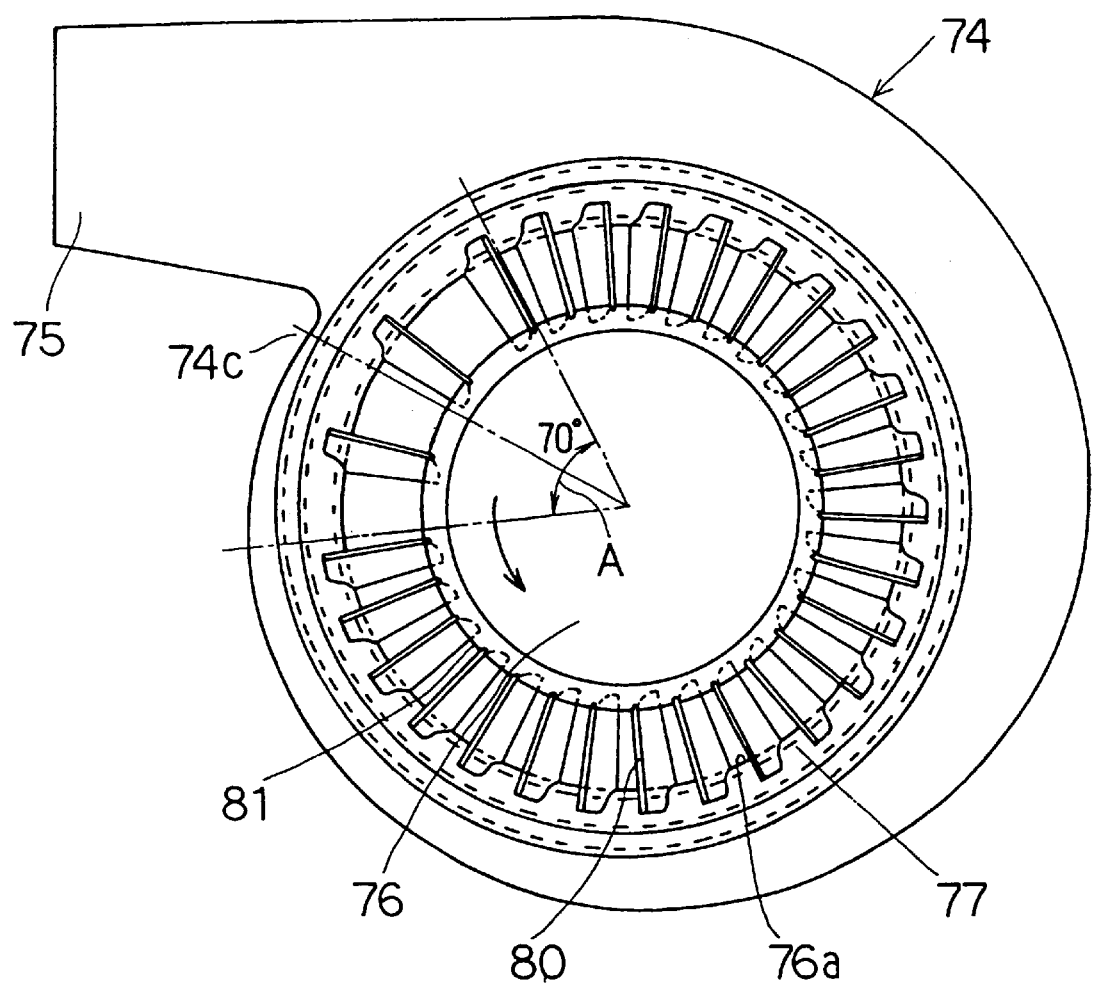
FIG. 8 is a plan view of a centrifugal blower according to the second embodiment.

As shown in FIG. 8, the distance between the adjacent blades 80 arranged in a certain area (hereinafter, referred to as area A) which is in the range of approximately 70° from a center line corresponding to the nose portion 74c (FIG. 3) of the casing 74 is set to be larger than those in the other area (which is not area A).

Thus, the air with a pressure fluctuation generated by the main blade 71 is prevented from interfering with the sub blade 80, thereby reducing the rotation noise.

Here, the nose portion 74c is, as is well known, the location where the upstream side (scroll commencing side) and the downstream side (scroll ending side) of the air passage 74a are communicated with each other.

(Third Embodiment)

The third embodiment is to reduce the rotation noise as well as in the second embodiment.

Figure 9A:
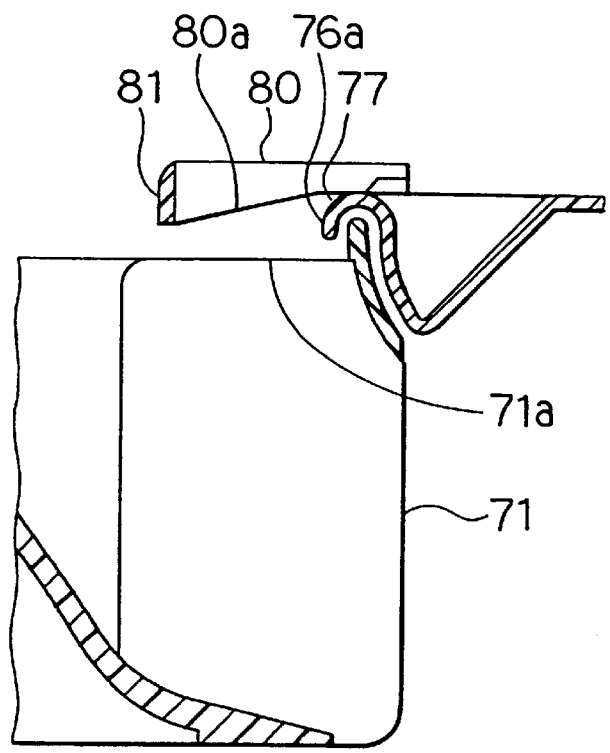
FIGS. 9A and 9B are cross sectional views showing a principal part of a centrifugal blower according to the third embodiment.
Figure 9B:
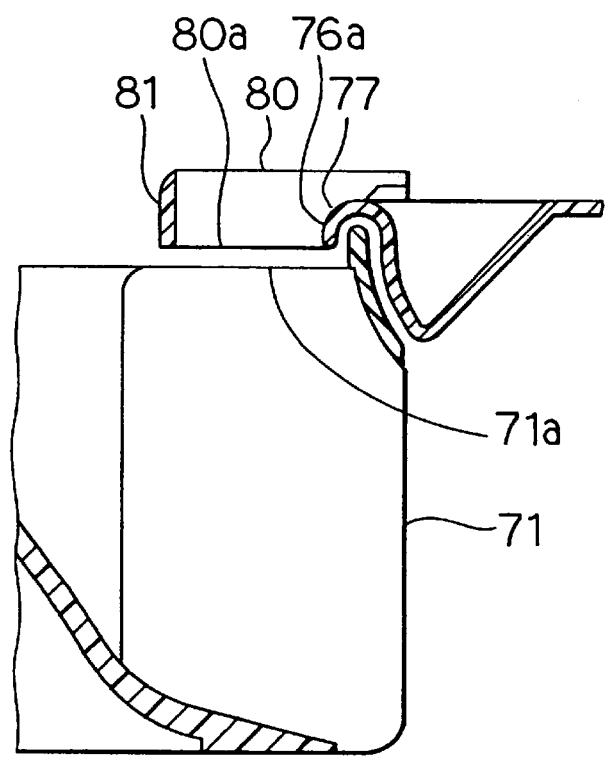

As shown in FIG. 9A, in the area A, the lower end 80a (main blade side end) of the sub blade 80 is inclined with respect to the direction perpendicular to the motor shaft such that a distance between the lower end 80a of the sub blade 80 and the upper end 71a of the main blade 71 is gradually increased from an inner side to an outer side. Thus, the air with a pressure fluctuation generated by the main blade 71 is prevented from interfering with the sub blade 80, thereby reducing the rotation noise.

Figure 10:
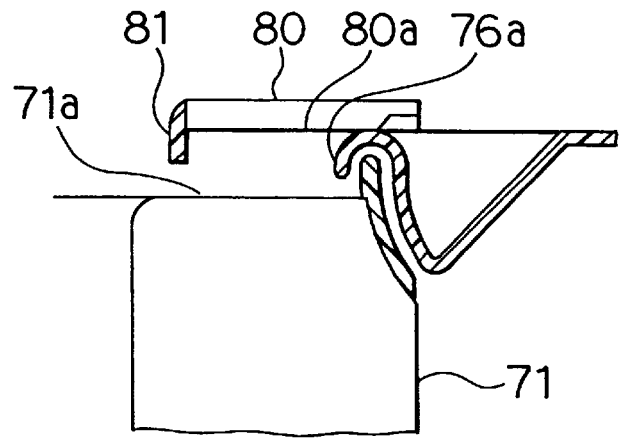
FIG. 10 is a cross sectional view showing a principal part of a modification of the third embodiment.

In this third embodiment, as shown in FIG. 10, setting the lower end 80a of the sub blade 80 in the area A to be substantially parallel to the upper end 71a of the main blade 71 such that a distance between the lower end 80a of the sub blade 80 and the main blade 71 is larger than those out of the area A is possible.

(Fourth Embodiment)

Figure 11:
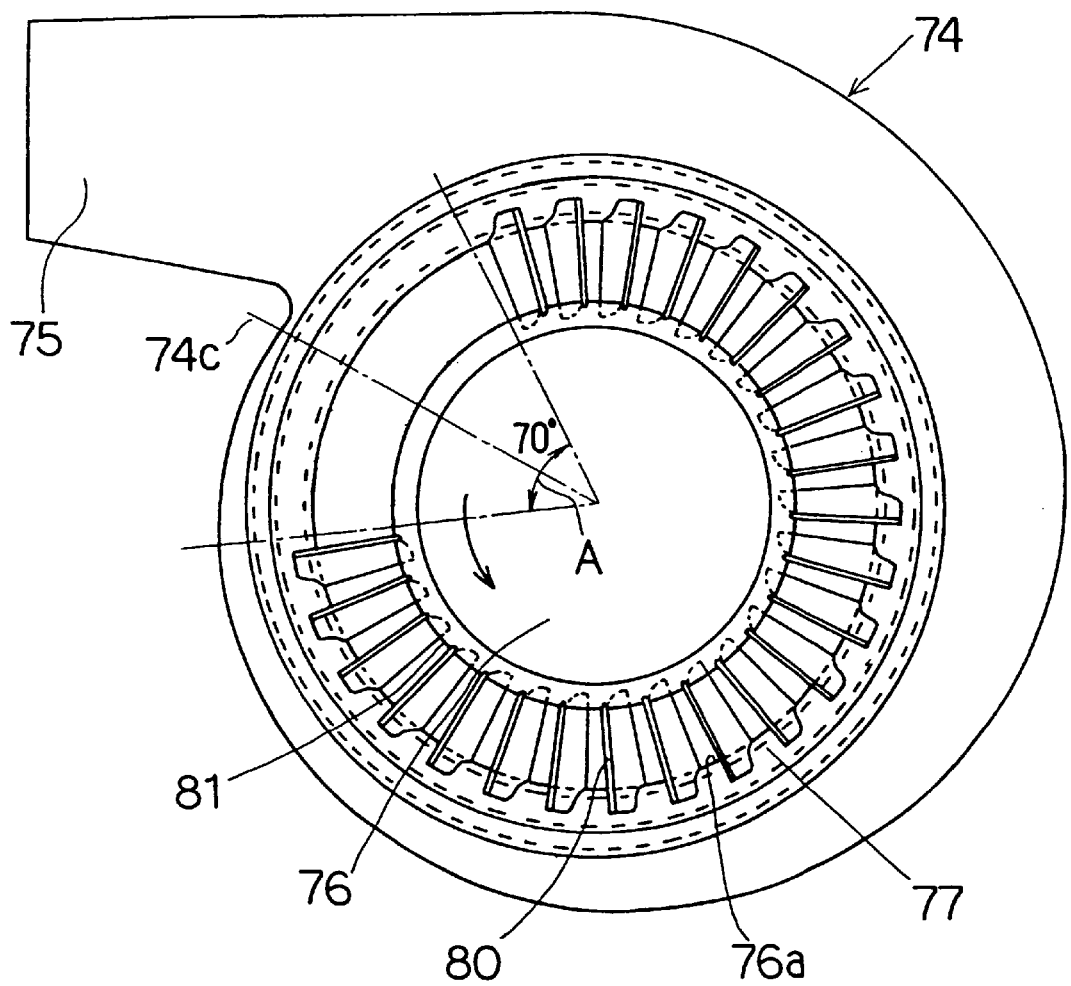
FIG. 11 is a plan view of a centrifugal blower according to the fourth embodiment.

According to the present fourth embodiment, as shown in FIG. 11, a large number of sub blades 80 are provided only angularly outside of the area A.

By this, the same effect as in the second and third embodiments is provided.

(Fifth Embodiment)

Figure 12:
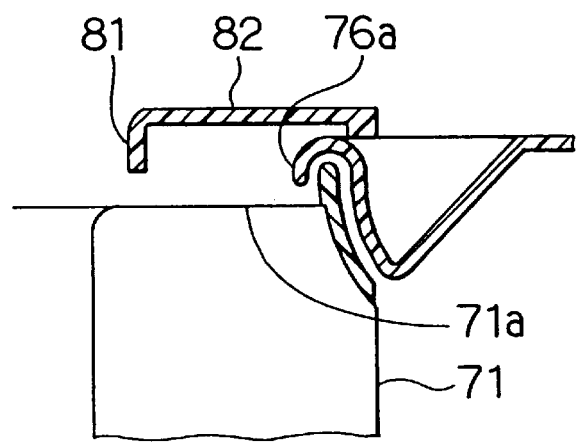
FIG. 12 is a cross sectional view showing a principal part of a centrifugal blower according to the fifth embodiment.

According to the fifth embodiment, as shown in FIG. 12, a lid portion 82 covering the area A of the intake opening 76 is provided.

Thus, the air being introduced from the area A is shut off, thereby reducing the air fluctuation generated by the rotation of the main blade 71 and the rotation noise.

(Sixth Embodiment)

The sixth embodiment is to reduce the rotation noise generated by interference between the air and the guide wall 81, when the guide wall 81 is provided.

Figure 13:
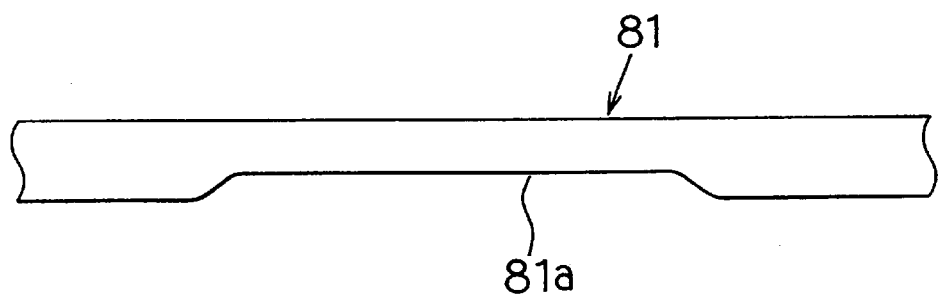
FIG. 13 is a plan view of a guide wall of a centrifugal blower according to the sixth embodiment seen from a rotating center of a fan.

As shown in FIG. 13, a recess portion 81a is formed for enlarging a distance between the guide wall 81 and the main blade 71 in the area A rather than that in the other area.

Thus, the interference between the air with the pressure fluctuation and the guide wall 81 is suppressed, thereby reducing the rotation noise.

Figure 14:
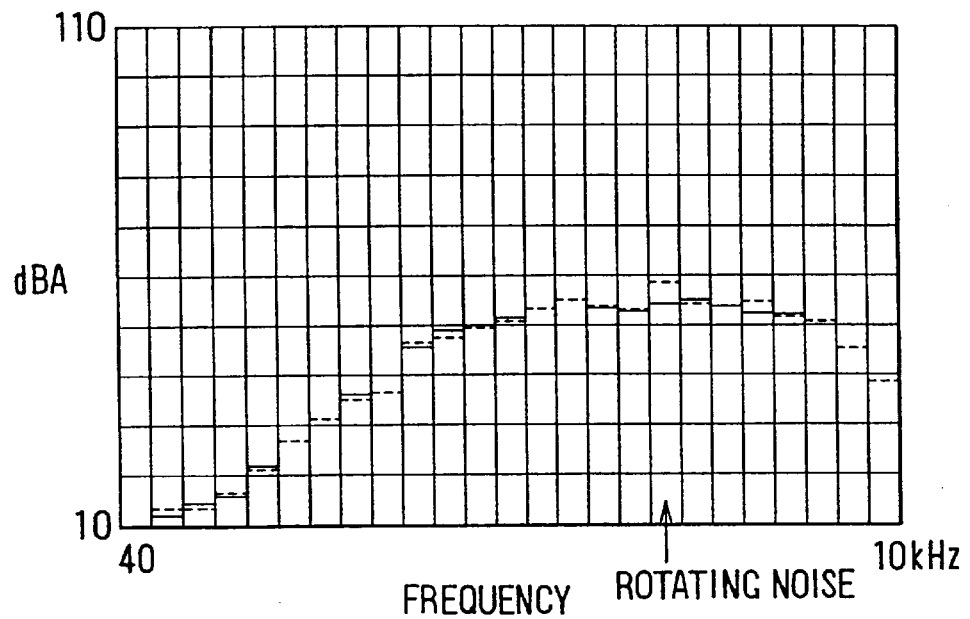
FIG. 14 shows a result of a noise level test.
Figure 15:
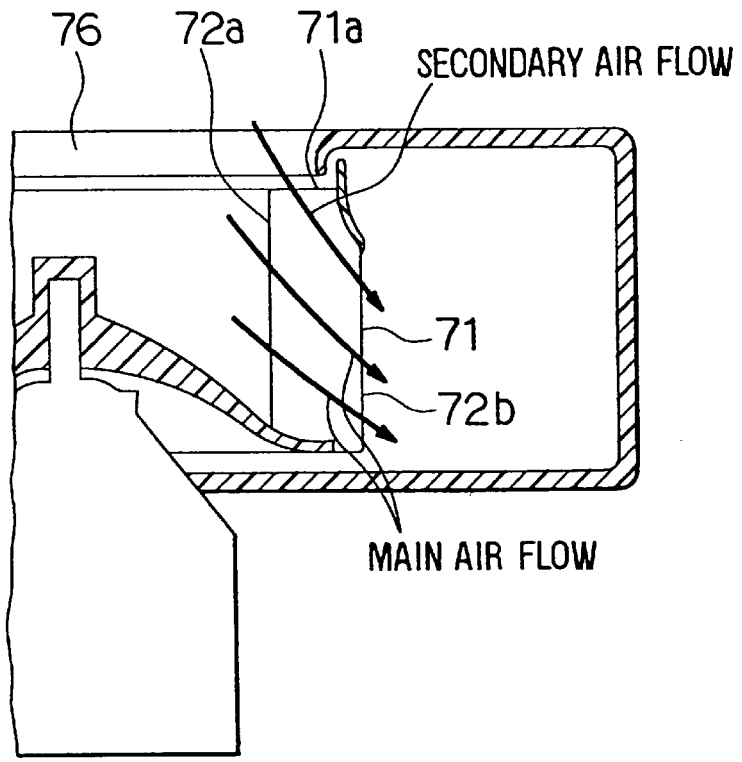
FIG. 15 is a cross sectional view of a conventional centrifugal blower.
Figure 16:
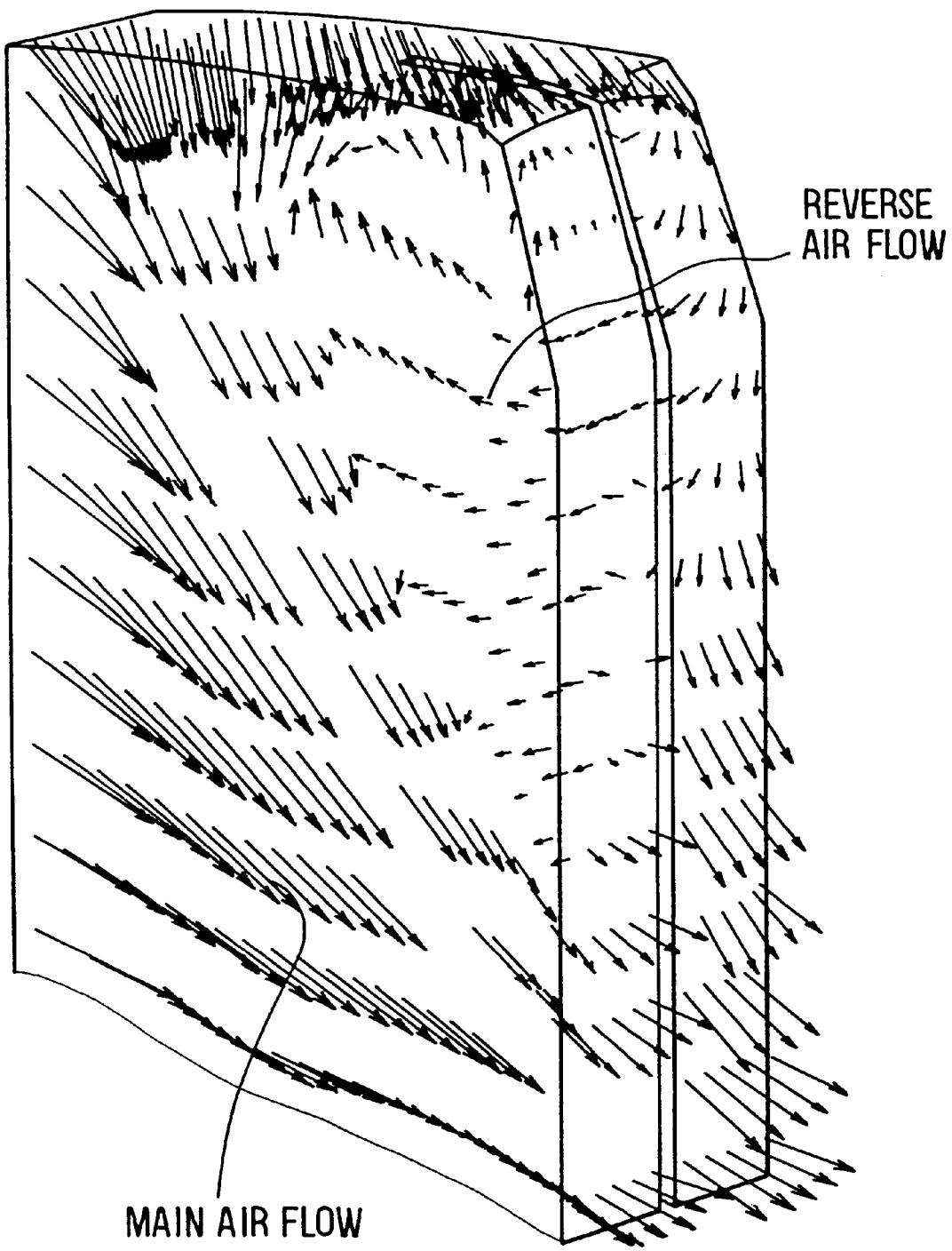
FIG. 16 shows air flow vector of an air flowing between adjacent blades in the conventional centrifugal fan.

In FIG. 14, the solid line denotes a noise test result of the blower according to the present embodiment (blower having the recess portion 81a) including a feature of the blower according to the third embodiment (FIG. 9A), and the dotted line denotes that of the blower according to the first embodiment having none of these features.

As is apparent from FIG. 14, the noise generated by the former blower is reduced compared to that by the latter blower. Here, the reduced noise amount is about 0.5 dBA overall.

In the above second through sixth embodiments, the guide wall 81 is disposed above the main blade 71 and is not elongated toward the air downstream side more than the upper end 71a of the main blade 71. However, it should be noted that, in the second through sixth embodiments also, the guide wall 81 toward the air downstream side may be elongated more than the upper end 71a of the main blade 71 as in the first embodiment.

What is claimed is:

1. A centrifugal blower comprising:

a centrifugal blade fan having a plurality of main blades around a rotation axis thereof;

a scroll casing encasing said centrifugal blade fan therein and forming an air passage through which air discharged by said centrifugal blade fan flows, said scroll casing having an intake opening which is opened in a direction of said rotation axis on said scroll casing; and a plurality of sub blades disposed at a location corresponding to said main blades in said intake opening, wherein an outer periphery of said intake opening is arranged outside of an inner edge of said main blade;

said main blade defines an intake opening side end facing said intake opening, and said sub blade leads air to said intake opening side end of said main blade.

2. A centrifugal blower according to claim 1, wherein said sub blade is formed integrally with said scroll casing and leads the air introduced from a location corresponding to said main blade to a rotating direction of said centrifugal blade fan.

3. A centrifugal blower according to claim 1, wherein said sub blade defines a main blade side end facing said intake opening side end of said main blade; and in a radially outer side area, a distance between said intake opening side end of said main blade and said main blade side end of said sub blade arranged in a predetermined angular area (A) covering a location corresponding to a nose portion of said scroll casing is larger than that in other area.

4. A centrifugal blower according to claim 1, wherein said sub blade defines a main blade side end facing said intake opening side end of said main blade;

said main blade side end of said sub blade is inclined with respect to a direction perpendicular to said rotation axis such that a space between said intake opening side end of said main blade and said main blade side end of said sub blade arranged in a predetermined angular area (A) covering a location corresponding to a nose portion of said scroll casing is gradually increased from an inner side to an outer side in a radial direction.

5. A centrifugal blower according to claim 1, wherein a distance between adjacent two of said sub blades arranged in a predetermined angular area (A) covering a location corresponding to a nose portion of said scroll casing is larger than that in other area.

6. A centrifugal blower according to claim 1, further comprising a lid portion covering said intake opening in a predetermined angular area (A) covering a location corresponding to a nose portion of said scroll casing.

7. A centrifugal blower according to claim 1, wherein said plurality of sub blades are disposed except in a predetermined angular area (A) covering a location corresponding to a nose portion of said scroll casing.

8. A centrifugal blower according to claim 1, further comprising a bell mouth ring-shaped guide wall provided in said intake opening at a said inner edge side of said main blade.

9. A centrifugal blower according to claim 8, wherein, in a predetermined angular area (A) covering a location corresponding to a nose portion of said scroll casing, said guide wall includes a recess portion for enlarging a distance between said guide wall and said main blade rather than that in other area.

10. A centrifugal blower according to claim 3, wherein said predetermined angular area (A) is in a range of approximately 70° from a center line corresponding to said nose portion of said scroll casing.

11. A centrifugal blower according to claim 8, wherein said bell mouth ring-shaped guide is integrated with said scroll casing.

12. A centrifugal blower according to claim 1, further comprising a bell mouth formed at the outer periphery of said intake opening integrally for introducing an air smoothly, wherein said sub blade and said bell mouth are integrated with said scroll casing.

13. An air conditioning apparatus for a vehicle comprising:

an air conditioning casing forming an air passage;

a centrifugal blower disposed at an air upstream side in said air conditioning casing, said centrifugal blower including a centrifugal blade fan having a plurality of main blades around a rotation axis thereof, a scroll casing in which said centrifugal blade fan is disposed and an air passage through which air discharged by said centrifugal blade fan flows is provided, an intake opening which is opened in a direction of said rotation axis on said scroll casing, and a plurality of sub blades disposed at a location corresponding to said main blades in said intake opening;

a face air outlet provided at an air downstream side of said centrifugal blower in said air conditioning casing through which air-conditioned air is discharged toward a face area in a vehicle compartment;

a foot air outlet provided at an air downstream side of said centrifugal blower in said air conditioning casing through which the air-conditioned air is discharged toward a foot area in said vehicle compartment; and a defroster air outlet provided at an air downstream side of said centrifugal blower in said air conditioning casing through which the air-conditioned air is discharged toward inside of a windshield glass of said vehicle, wherein an outer periphery of said intake opening is arranged outside of an inner edge of said main blade;

said main blade defines an intake opening side end facing said inlet, and said sub blade leads an air to said intake opening side end of said main blade.

* * * * *